US009589719B2

(12) United States Patent
Heo et al.

(10) Patent No.: US 9,589,719 B2
(45) Date of Patent: Mar. 7, 2017

(54) SWITCHABLE PATTERNED METAL SHIELD INDUCTANCE STRUCTURE FOR WIDEBAND INTEGRATED SYSTEMS

(71) Applicant: Washington State University, Pullman, WA (US)

(72) Inventors: Deukhyoun Heo, Pullman, WA (US); Pawan Agarwal, Pullman, WA (US)

(73) Assignee: WASHINGTON STATE UNIVERSITY, Washington ( * ) Notice: Subject to any disclaimer, the term of this patent is extended or adjusted under 35 U.S.C. 154(b) by 0 days.

(21) Appl. No.: 14/673,814

(22) Filed: Mar. 30, 2015

(65) Prior Publication Data

US 2015/0279551 A1 Oct. 1, 2015

Related U.S. Application Data

(60) Provisional application No. 61/973,231, filed on Mar. 31, 2014.

(51) Int. Cl.
*H01F 27/32* (2006.01)
*G01V 3/10* (2006.01)
(Continued)

(52) U.S. Cl.
CPC .................................. *H01F 27/365* (2013.01)

(58) Field of Classification Search
CPC .... H01F 27/365; H01F 27/36; H01F 27/2804; H01F 27/362; H01F 21/10; H01F 2021/125
(Continued)

(56) References Cited

U.S. PATENT DOCUMENTS 7,091,784 B1 8/2006 Terrovitis
2002/0158306 A1* 10/2002 Niitsu ................ H01F 17/0006 257/531

(Continued)

FOREIGN PATENT DOCUMENTS

EP 2662870 A1 11/2013

OTHER PUBLICATIONS

Guoqin et al.,"A dual-band reconfigurable direct-conversion receiver RF front-end" Journal of Semiconductors, vol. 30, No. 9, pp. 1-5, Sep. 2009.

(Continued)

*Primary Examiner* — Mangtin Lian
(74) *Attorney, Agent, or Firm* — Turk IP Law, LLC

(57) ABSTRACT

Technologies are generally described for switchable patterned metal shield inductance structures. In some examples, an inductance structure on a substrate may include an inductor and a metal shield, where the metal shield separates and shields the inductor from the substrate. The configuration of the metal shield and the inductor may facilitate reduction in the overall inductance of the inductance structure. In particular, the metal shield may be configured to develop one or more eddy currents in response to an inductor-generated magnetic field. The eddy currents may then result in a magnetic field opposing the inductor-generated magnetic field, which may result in a reduction in the overall magnetic field and the overall inductance of the inductance structure. The metal shield may be switchable between multiple modes, where each mode may be effective to reduce the overall inductance by a different amount.

25 Claims, 6 Drawing Sheets

(51) Int. Cl.
*H01F 5/00* (2006.01)
*H01F 27/28* (2006.01)
*H01F 27/36* (2006.01)

(58) Field of Classification Search
USPC ................................ 336/84 C, 200, 232, 87
See application file for complete search history.

(56) References Cited

U.S. PATENT DOCUMENTS

| | | | | |
|---|---|---|---|---|
| 2004/0124960 | A1* | 7/2004 | Blanchard | H01L 27/08 336/200 |
| 2005/0156700 | A1 | 7/2005 | Chang | |
| 2009/0146252 | A1* | 6/2009 | Huang | H01L 23/5227 257/531 |
| 2014/0375259 | A1* | 12/2014 | Wu | B60R 16/03 320/108 |
| 2015/0084733 | A1* | 3/2015 | Sun | H01F 27/362 336/84 C |

OTHER PUBLICATIONS

Y. Pen-Li, H. Tzuen-Hsi, "A Switched Inductor Topology Using a Switchable Artificial Grounded Metal Guard Ring for Wide-FTR MMW VCO Applications," IEEE Transactions on Electron Devices, vol. 60, No. 2, pp. 759-766, Feb. 2013.
G. Li, Y. Tang, E. Afshari., "A Low-Phase-Noise Wide-Tuning—Range Oscillator Based on Resonant Mode Switching," IEEE JSSC, vol. 47, No. 6, pp. 1295-1308, Jun. 2012.
C.P. Yue, S.S. Wong, "On-chip spiral inductors with patterned ground shields for Si-based RF ICs," IEEE Journal of Solid-State Circuits, vol. 33, No. 5, pp. 743-752, May 1998.

* cited by examiner

SWITCHABLE PATTERNED METAL SHIELD INDUCTANCE STRUCTURE FOR WIDEBAND INTEGRATED SYSTEMS

CROSS-REFERENCE TO RELATED APPLICATION

This application claims benefit under 35 U.S.C. §119(e) to U.S. Provisional Patent Application Ser. No. 61/973,231 filed on Mar. 31, 2014, entitled "Switchable Patterned Metal Shield Inductor for Wideband Integrated Systems". The disclosures of the provisional application are hereby incorporated by reference for all purposes.

BACKGROUND

Unless otherwise indicated herein, the materials described in this section are not prior art to the claims in this application and are not admitted to be prior art by inclusion in this section.

Wireless communication devices may operate across a variety of different frequency bands. A particular device configured to operate in particular frequency bands may include passive electronic elements, such as capacitors and inductors, selected and sized based on those frequency bands. For devices fabricated on a semiconductor substrate, shielding may be used to isolate the passive elements from the lossy substrate in order to maintain or improve element performance.

SUMMARY

The present disclosure generally describes techniques to adjust the inductance of a switchable patterned metal shield inductance structure.

According to some examples, variable inductance structures on a substrate are described. An example variable inductance structure may include an inductor configured to develop a first magnetic field in response to a current flowing through the inductor, a shield structure configured to shield the inductor from the substrate, and a coupling circuit that includes a first terminal, a second terminal and a control terminal. The shield structure may include a first portion with a first terminal and a second portion with a second terminal. The first terminal of the coupling circuit may be coupled to the first terminal of the shield structure, the second terminal of the coupling circuit may be coupled to the second terminal of the shield structure, and the control terminal may be configured to receive a control signal, where the coupling circuit is configured to selectively adjust a coupling of the first and second terminals in response to the control signal such that the shield structure and the inductor are configured in one or more of a first mode and a second mode. A first eddy current may be developed in response to the first magnetic field in the first mode effective to decrease an overall inductance of the variable inductance structure by a first amount, and a second eddy current may be developed in response to the first magnetic field in the second mode effective to decrease the overall inductance by a second amount different from the first amount.

According to other examples, variable inductance structures on a substrate are described. An example variable inductance structure may include an inductor to develop a first magnetic field in response to a current flowing through the inductor and a shield structure to shield the inductor from the substrate, where the shield structure may include a first portion and a second portion, the first portion and the second portion selectively couplable based on a control signal. The shield structure may be configured to, in a first mode, develop a first eddy current in response to the first magnetic field such that an overall inductance of the variable inductance structure is decreased by a first amount; and, in a second mode, develop a second eddy current in response to the first magnetic field such that the overall inductance is decreased by a second amount different from the first amount.

According to further examples, methods to adjust an inductance of a variable inductance structure on a substrate are described. An example method may include shielding an inductor from the substrate with a shield structure, where the shield structure includes two portions; coupling the two portions of the shield structure together such that the shield structure develops a first eddy current in response to a magnetic field generated by the inductor to decrease an overall inductance of the variable inductance structure by a first amount; and decoupling the two portions such that the shield structure develops a second eddy current in response to the magnetic field to decrease the overall inductance by a second amount different from the first amount, where the second eddy current is smaller than the first eddy current.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
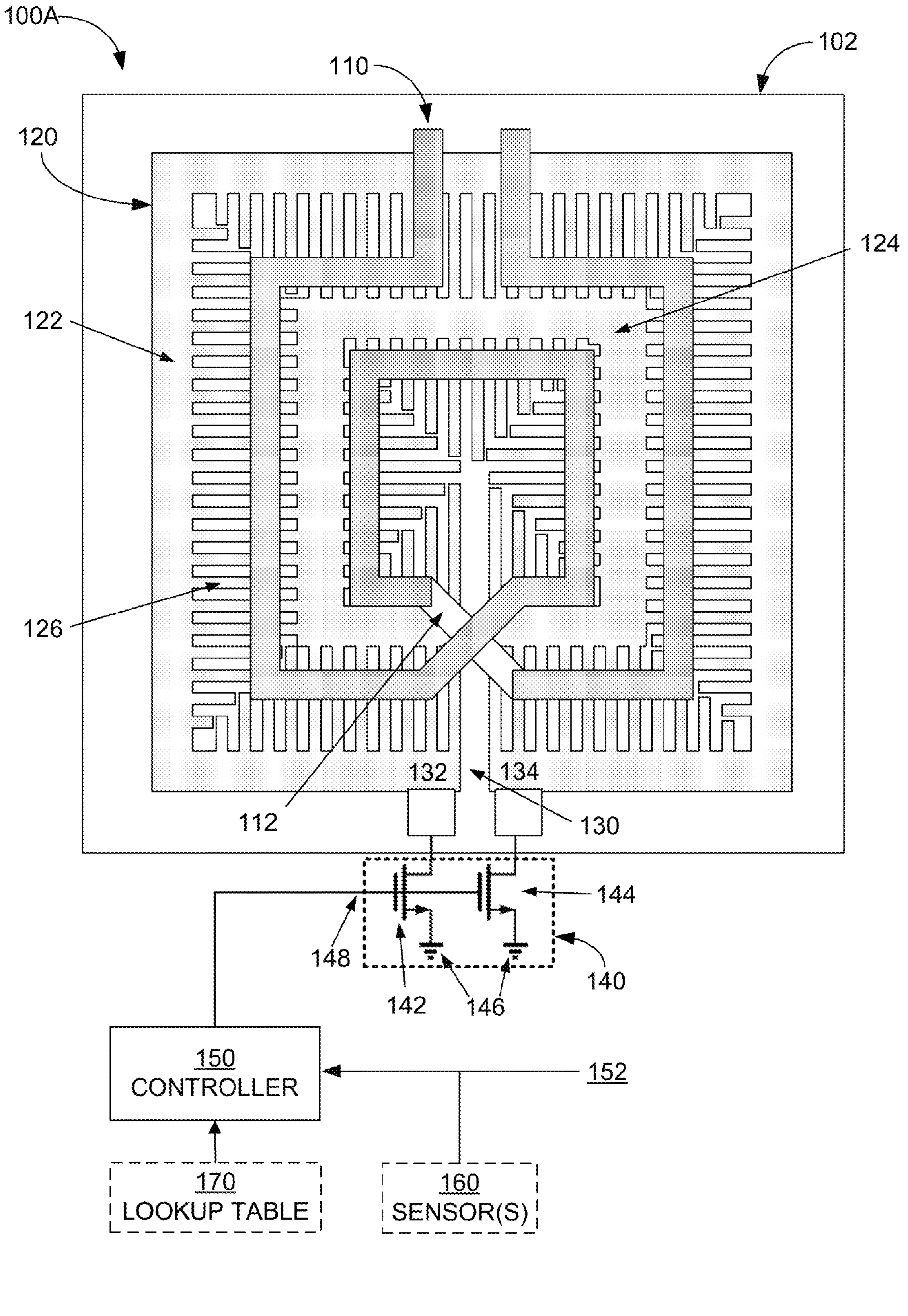
FIG. 1A illustrates an example switchable metal shield inductance structure with an optional controller.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to switchable patterned metal shield inductance structures.

Briefly stated, technologies are generally described for switchable patterned metal shield inductance structures. In some examples, an inductance structure on a substrate may include an inductor and a metal shield, where the metal shield separates and shields the inductor from the substrate. The configuration of the metal shield and the inductor may facilitate reduction in the overall inductance of the inductance structure. In particular, the metal shield may be configured to develop one or more eddy currents in response to an inductor-generated magnetic field. The eddy currents may then result in a magnetic field opposing the inductor-generated magnetic field, which may result in a reduction in the overall magnetic field and the overall inductance of the inductance structure. The metal shield may be switchable between multiple modes, where each mode may be effective to reduce the overall inductance by a different amount.

FIG. 1A illustrates an example switchable metal shield inductance structure with an optional controller, arranged in accordance with at least some embodiments described herein.

The switchable metal shield inductance structure 100A may include an inductor 110 and a switchable metal shield 120. The switchable metal shield 120 may include two or more portions such as an outer ring 122, an inner ring 124, and at least one strip 126 that may couple the outer ring 122 to the inner ring 124. The switchable metal shield 120 may further include a gap 130 configured to break the continuity of each of the outer ring 122 and the inner ring 124. The gap 130 may include a discontinuity in the outer ring 122 between two portions of the outer ring 122. The gap 130 may also include a discontinuity in the inner ring 124 between two portions of the inner ring 124. In some embodiments, a coupling circuit 140 may be coupled across the gap 130 to ends 132 and 134 of the outer ring 122. In one example implementation, the coupling circuit 140 may include transistors 142 and 144. One set of terminals of the transistors 142 and 144 may be electrically coupled to respective ends 132 and 134. Another set of terminals of the transistors 142 and 144 may be electrically coupled to an on-chip reference potential or circuit ground 146. In some embodiments, control terminals (e.g., gate terminals in a FET implementation) of the transistors 142 and 144 may be electrically coupled in common to an input 148, allowing a signal from the input 148 to control the states of the transistors 142 and 144 via their respective biasing. An optional controller 150 may in turn provide signals to the input 148 to control the states of the transistors 142 and 144. The controller 150 may be coupled to a controller input 152, one or more optional sensors 160, and an optional lookup table 170. The sensors 160 and/or the lookup table 170 may be used to retrieve a setting that can be used to determine the appropriate adjustments to be made to the coupling circuit 140. For example, the lookup table 170 may correspond to an association between a particular inductance values and particular input values (e.g., drive signals or bias signals) for the coupling circuit 140.

In some embodiments, the inductor 110 may be formed of electrically conductive material, such as a metal, a polysilicon, and the like, and may be fabricated with a number of turns such that a current flowing through the inductor 110 results in development of a magnetic field in the inductor 110. When the current is time varying, the developed magnetic field may cause the inductor 110 to resist changes in the current, in effect storing energy in the inductor 110. The resistance to changes in current and energy storage may be characterized by an inductance value of the inductor 110. As shown in FIG. 1, the inductor 110 is depicted as a single-layer dual-turn structure, with the exception of a bridge 112 coupling the inner turn to the outer turn. However, in other embodiments, the inductor 110 may have fewer or more turns and/or may be fabricated as a multi-layer structure.

The switchable metal shield inductance structure 100A may be disposed on a substrate 102, where the substrate 102 may be any suitable substrate, such as a thin film substrate, a thick film substrate, a ceramic substrate, a semiconductor substrate, a multi-chip module, and/or any combination thereof. In situations where an inductor includes an inductor 110 disposed on a substrate such as the substrate 102 without the presence of shielding (i.e., without switchable metal shield 120), the substrate and the inductor may be coupled together. The coupling between the substrate and the inductor may result in energy transfer between the substrate and the inductor, which may reduce inductor performance (for example, as measured by an inductor quality factor), in turn leading to performance degradation in devices associated with the inductor. For example, if the inductor is part of an LC (inductance-capacitance) tank circuit of a voltage-controlled oscillator (VCO) used to generate clock signals of varying frequency, the reduced inductor quality factor may lead to decreased frequency selectivity of the LC-tank circuit and a corresponding increase in phase noise.

In some embodiments, the switchable metal shield 120 may be configured to isolate, decouple, or shield the inductor 110 from the substrate 102. For example, the switchable metal shield 120 may be disposed between the substrate 102 and the inductor 110. The switchable metal shield 120 may be configured to reduce the energy loss from the inductor 110 to the substrate 102, consequently reducing quality factor reduction and performance degradation. The outer ring 122, the inner ring 124, and/or the strips 126 may include metal, polysilicon, or any other suitable electrically conductive material, and may be aligned and arranged with spacing sufficient to shield the inductor 110 from the substrate 102.

In accordance with Lenz's Law, a conductive structure in proximity to an inductor such as the inductor 110 may develop eddy currents in response to a magnetic field developed by the inductor. The eddy currents may then result in magnetic fields that oppose the inductor-developed magnetic field, reducing the overall magnetic field and the overall inductance. In order to prevent the reduction of the overall magnetic field and the changes in the overall inductance from happening inadvertently, the gap 130 in the metal shield 120 introduces discontinuities in the outer ring 122 and the inner ring 124, preventing the formation of a closed current loop in either ring.

In some embodiments, the tendency of an inductor-developed magnetic field to induce eddy currents may be utilized to control the overall inductance of the inductance structure 100A. For example, as described above, the gap 130 in the metal shield 120 may prevent eddy currents and their magnetic fields from developing, thus preventing reduction of the overall inductance. On the other hand, if the gap 130 is closed, then eddy currents and their magnetic fields may develop in the metal shield 120, causing a reduction in the overall inductance. By selectively opening and closing the gap 130, the overall inductance may be controlled.

In some embodiments, the coupling circuit 140 may be configured to selectively open and close the gap 130. The coupling circuit 140 may include the transistors 142 and 144, each of which may be coupled (e.g., via drain terminals) to an end of the outer ring 122 (132 and 134, respectively). The coupling circuit 140 may also be coupled (e.g. via source terminals) to a shared on-chip reference potential 146. The switching states of the transistors 142 and 144 may be controlled by the input 148. A signal at the input 148 that exceeds the on-chip reference potential 146 by an amount sufficient to forward bias the transistors 142 and 144 may cause the coupling circuit 140 to close the gap 130. In this situation, the transistors 142 and 144 may be activated (e.g., forward biased with conduction, also referred to as being "ON") and the ends 132 and 134 may be effectively coupled to the on-chip reference potential 146. The coupling circuit 140 may then bridge or close the gap 130, allowing eddy currents to be formed, which in turn may significantly reduce the overall inductance of the inductance structure 100A. On the other hand, when the signal at the input 148 does not exceed the on-chip reference potential 146 by an amount sufficient to forward bias the transistors 142 and 144, the transistors 142 and 144 may be deactivated (e.g., in a cutoff or subthreshold mode, also referred to as being "OFF"), decoupling the ends 132 and 134 from each other and the on-chip reference potential 146. As a result, the coupling circuit 140 may maintain the gap 130, and the overall inductance of the inductance structure 100A may not be significantly reduced.

The transistors 142 and 144 are illustrated as a pair of n-type devices (e.g., n-type FETs, nMOS devices, or npn BJT devices). However, the implementation of the coupling circuit 140 should not be so limited. In some examples, the coupling circuits may be implemented as p-type devices (e.g., p-type FETs, pMOS devices, or pnp BJT device). In additional examples, the coupling circuit 140 may be implemented with complementary pairs of devices such as transmission gate configured devices. Other varieties of coupling circuits may also be utilized to achieve the same result of selectively closing or opening the gap.

As described above, the controller 150 may be configured to operationally couple a control signal to the input 148, where the control signal is adjusted by the controller 150 effective to selectively control the switching states of the transistors 142 and 144 (and hence the switching state of the coupling circuit 140). In one embodiment, the controller 150 may receive an input signal from the controller input 152, where the input signal indicates that the overall inductance of the inductance structure 100A can be adjusted by the controller 150. In some examples, the input signal at the controller input 152 may correspond to an analog signal, while in some other examples the input signal may correspond to a digital signal. In various examples, the input signal may be a sensor signal (e.g., an analog or digital measurement signal) while in other instances the input signal may be estimated from a sensor signal (e.g., an analog or digital estimation based on a measurement). In some examples, the input signal may be associated with a characteristic of the operation of the inductor (e.g., an inductance value, a quality factor, a frequency of operation associated with the inductor, etc.).

In some examples, the controller 150 may be configured to adjust the overall inductance of the switchable metal shield inductance structure 100A in response to the input signal by a relative amount (e.g., increase or decrease by a delta amount) or to an absolute overall inductance value. In response to the input signal, the controller 150 may control the coupling circuit 140 (e.g., via the input 148) to facilitate adjustment to the requested inductance. The controller 150 may operate using digital or analog signals. For example, in an analog operation, the controller 150 may compare a sensed signal to a reference signal and take one course of action (e.g., increase drive to transistor) when the sensed signal is greater than the reference by an amount. The controller 150 may take another course of action (e.g., decrease the drive to the transistor) when the sensed signal is less than the reference signal by another amount.

In some embodiments, the controller 150 may cooperate with one or more sensor(s) 160 to sense (or in some examples calculate or estimate) an operational characteristic of the switchable metal shield inductance structure 100A. The controller 150 and the sensor 160 may be arranged in cooperate with the coupling circuit 140 in a feedback loop to dynamically control the overall operation of the switchable metal shield inductance structure 100A. For example, one or more sensor(s) 160 may be configured to detect the overall inductance of the inductance structure 100A, and the controller 150 may use a feedback topology that is responsive to the sensor signal(s) received from the sensor(s) 160, where the controller determines the appropriate adjustments (e.g., dynamically varying a drive/bias signal to the coupling circuit) to be made to the coupling circuit 140. In some embodiments, the controller 150 may instead (or in addition) use the lookup table 170 to retrieve a setting that can be used to determine the appropriate adjustments to be made to the coupling circuit 140. For example, the lookup table 170 may correspond to an association between a particular inductance values and particular input values (e.g., drive signals or bias signals) for the coupling circuit 140. After retrieving the look-up table value, the controller 150 may determine the particular input value (e.g., drive or bias signal) associated with the requested inductance and apply the determined input value (e.g., drive or bias signal) at the input 148.

Figure 1B:
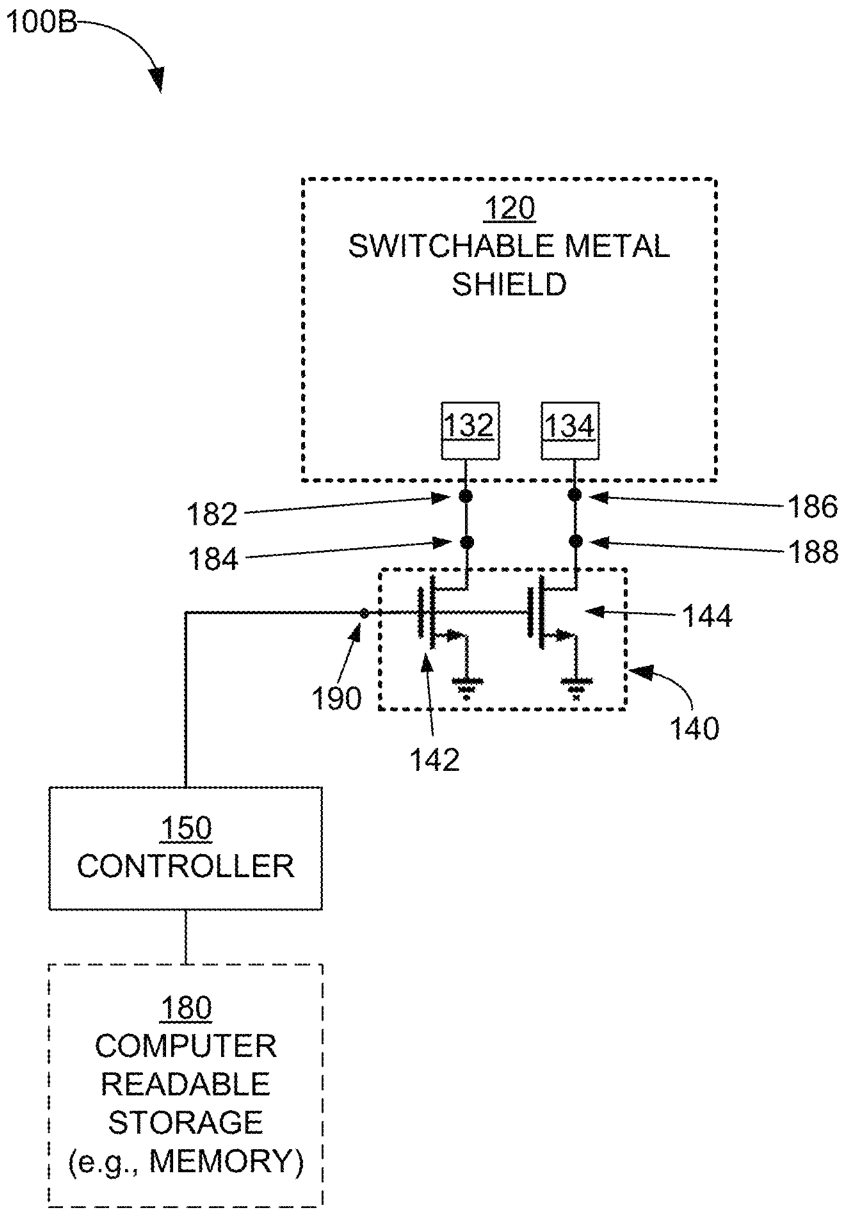
FIG. 1B illustrates an example configuration of a switchable metal shield inductance structure with a coupling circuit and a controller.

FIG. 1B illustrates an example configuration of a switchable metal shield inductance structure with a coupling circuit and a controller, arranged in accordance with at least some embodiments described herein.

As shown in diagram 100B, the switchable metal shield 120 may include ends 132 and 134 of a substantially ring-like portion that includes a gap. The ends 132 and 134 may represent or be coupled to a first terminal 182 and a second terminal 186 of the switchable metal shield 120. A coupling circuit 140 may be implemented through two or more transistors 142, 144, and include a first terminal 182 and a second terminal 188. The first terminal 182 of the coupling circuit 140 may be coupled to the first terminal 184 of the switchable metal shield 120. Likewise, second terminal 188 of the coupling circuit 140 may be coupled to the second terminal 186 of the switchable metal shield 120. The coupling circuit 140 may also include a control terminal 190. The control terminal 190 may be configured to receive a control signal (also referred to as input signal above) from the controller 150, where the coupling circuit may selectively adjust a coupling of the first and second terminals in response to the control signal such that the switchable metal shield 120 and the underlying inductor are configured in a first mode and/or a second mode.

The controller 150 may control the switching of the switchable metal shield 120 through the control signal to the coupling circuit 140 by controlling the states of the transistors 142 and 144. In some embodiments, the controller 150 may be coupled to a computer readable storage 180 such as a memory circuit. The computer readable storage 180 may store a lookup table or data from one or more sensors, which may be used by the controller 150 to control the coupling circuit 140 and determine the appropriate adjustments to be made to the coupling circuit 140. For example, the data from the computer readable storage 180 may correspond to an association between a particular inductance values and particular input values (e.g., drive signals or bias signals) for the coupling circuit 140.

In various examples, the controller 150 may be implemented as a discrete circuit (e.g., analog, digital or a combination thereof), an integrated circuit, or a combination of discrete and integrated circuits. In additional embodiments, the controller 150 may be implemented as an application specific integrated circuit (ASIC), which may either be an analog circuit, a digital circuit, or a combination thereof. In some examples, the controller 150 may be a programmable logic device (PLD) such as a programmable gate array device, or some other similar integrated circuit.

In some embodiments, the controller 150 may be implemented using any suitable processor or controller, including but not limited to a microprocessor (μP), a microcontroller (μC), a digital signal processor (DSP), or any combination thereof. The controller 150 may include one more levels of caching, such as a level cache memory, a processor or controller core, and one or more registers. The processor or controller core may include an arithmetic logic unit (ALU), a floating point unit (FPU), a digital signal processing core (DSP Core), or any combination thereof. In some embodiments, a memory controller may also be used with the controller 150, or in some implementations, the memory controller may be an internal to the controller 150.

In some embodiments, the controller 150 may include or have access to one or more system memory modules or data storage devices. For example, the lookup table 170 may be stored in one or more system memory modules or data storage devices. The system memory modules may be of any type including but not limited to volatile memory (such as RAM), non-volatile memory (such as ROM, flash memory, etc.) or any combination thereof. In some embodiments, the system memory modules may include an operating system, one or more applications, and/or program data. In some embodiments, the operating system and/or the application(s) may be configured to process inputs received at the controller input 152 and/or generate signals for output to the input 148. The data storage devices may include removable and/or non-removable devices, such as magnetic disk devices (e.g., flexible disk drives and hard-disk drives (HDDs)), optical disk drives such as compact disk (CD) drives or digital versatile disk (DVD) drives, solid state drives (SSDs), tape drives, or any other suitable data storage device.

In some embodiments, the controller input 152 and/or the input 148 may be examples of communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Figure 2:
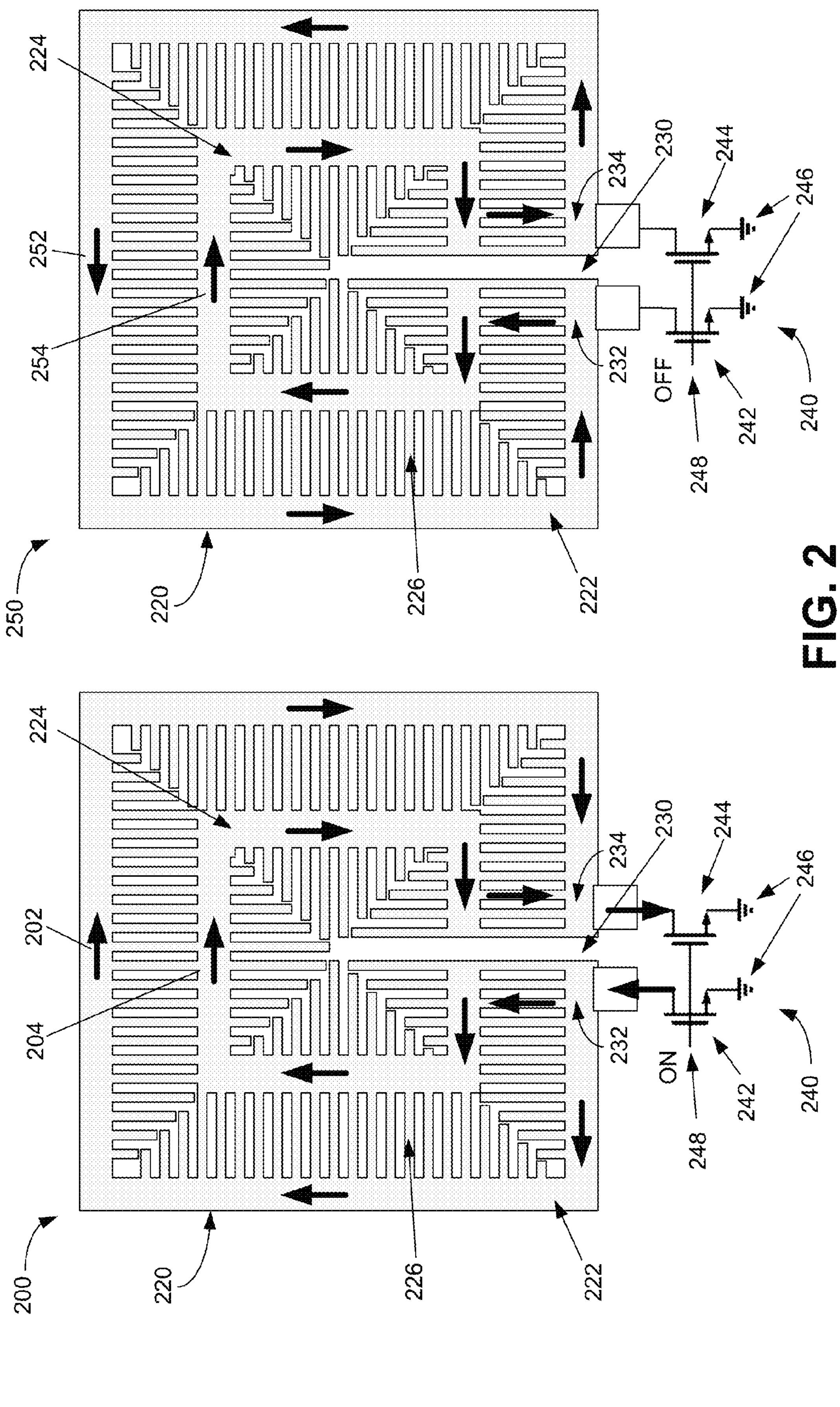
FIG. 2 illustrates example operation modes of a switchable metal shield in an inductance structure.

FIG. 2 illustrates example operation modes of a switchable metal shield in an inductance structure, arranged in accordance with at least some embodiments described herein.

FIG. 2 illustrates two diagrams 200 and 250, each of which depicts an example operation mode of a switchable metal shield 220. The views of the metal shield 220 in the diagrams 200 and 250 are similar to the view of the metal shield 120 in FIG. 1, but the inductor has been omitted for clarity. The switchable metal shield 220, similar to the switchable metal shield 120 in FIG. 1, includes an outer ring 222, an inner ring 224, and at least one strip 226 that may couple between the outer ring 222 and the inner ring 224. The switchable metal shield 220 may further include a gap 230 that includes discontinuities in the outer ring 222 and the inner ring 224. A coupling circuit 240 may be coupled across the gap 230 to ends 232 and 234 of the outer ring 222. In some embodiments, the coupling circuit 240 may include a pair of transistors 242 and 244. Each of the transistors in the coupling circuit 240 includes a terminal (e.g., a drain terminal) that is coupled to a respective one of ends 232 and 234. Each transistor is also coupled to an on-chip reference potential or ground 246 (e.g. at a source terminal coupled to ground 246), and a transistor control terminal (e.g., a gate terminal) that is coupled to an input 248. Although illustrated with metal oxide semiconductor (MOS) transistors, the coupling circuit 240 can be implemented in any type of suitable transistors such as BJT, MOS, JFET, etc. In other embodiments, the coupling circuit 240 may include any other suitable switching element or component, such as those described above in relation to the transistors 142 and 144 in FIG. 1

The diagram 200 depicts a first operating mode of the switchable metal shield 220 in which the coupling circuit 240 bridges (e.g. closes) or electrically couples the ends 232 and 234 together. In the first operating mode, an "ON" signal may be provided to the input 248 of the coupling circuit 240. The "ON" input signal may activate the transistors 242 and 244 into conduction (e.g., biasing the coupling circuit into active "closed" operation, such as forward biasing a transistor switching circuit), electrically coupling the ends 232 and 234, respectively, to the on-chip reference potential 246. Coupling the ends 232 and 234 to the same on-chip reference potential 246 may in effect couple the ends 232 and 234 together.

In the first operating mode depicted in the diagram 200, an inductor-developed magnetic field may induce eddy currents in the metal shield 220. Moreover, because in the first operating mode the coupling circuit 240 bridges the gap 230, eddy currents may flow around the entire metal shield 220. For example, supposing that an inductor-developed magnetic field pointing out of the plane of FIG. 2 is present, such a magnetic field may be developed in response to an inductor current flowing in a counterclockwise direction. The inductor-developed magnetic field may then induce eddy current components 202 and 204 in the outer ring 222 and the inner ring 224, respectively, which may flow in a clockwise direction. The clockwise eddy current components may then cause a magnetic field pointing into the plane of FIG. 2 to be developed, which may then counteract the inductor-developed magnetic field. As a result, the overall inductance of the metal shield 220 and its associated inductor may be reduced.

The diagram 250 depicts a second operating mode of the metal shield 220 in which the coupling circuit 240 does not bridge the gap 230, and instead maintains electrical separation or isolation across the gap 230. In the second operating mode, an "OFF" signal may be provided to the input 248 of the coupling circuit 240. The "OFF" input signal may be complementary to the "ON" input signal, and may deactivate the transistors 242 and 244 (e.g., cause the transistors 242 and 244 to enter the cutoff or subthreshold mode), electrically decoupling the ends 232 and 234, respectively, from each other and from the on-chip reference potential 246. In the second operating mode, an inductor-developed magnetic field may also induce eddy currents in the metal shield 220. However, because the ends 232 and 234 are decoupled from each other, an eddy current developed in the outer ring 222 cannot flow without passing to the inner ring 224, and vice-versa.

As an example, supposing that the same inductor-developed magnetic field described above is present, the inductor-developed magnetic field may be stronger within the area enclosed by the developing inductor. Accordingly, the inductor-developed magnetic field may have a stronger effect on the inner ring 224 than the outer ring 222, and may cause a clockwise eddy current component 254 opposing the inductor current (which may be counterclockwise) to be developed. However, in the second operating mode the ends 232 and 234 may be decoupled. Accordingly, the eddy current component 254 flows through the outer ring 222 via the strips 226 as a counterclockwise eddy current component 252 in order to form a complete current path. The opposing eddy current components 252 and 254 may then cause opposing magnetic fields to be developed, which at least partially cancel each other. As a result, there may be little if any magnetic field opposing the inductor-developed magnetic field, and the overall inductance of the metal shield 220 and its associated inductor may not be substantially affected.

While the metal shields 120 and 220 depicted in FIGS. 1 and 2 have inner and outer rings, in other embodiments, metal shields may have more or fewer rings. For example, a metal shield may have only one ring, and opposing eddy current components may flow at different edges of the single ring. Likewise, a metal shield may have three or more rings, with eddy current components distributed accordingly.

As described above, a coupling circuit may include one or more transistors, such as transistors 242/244 in some embodiments. Such transistors may switch on (allow current flow between source and drain terminals) and off (prevent current flow between source and drain terminals) to different degrees, based on the transistor switching characteristics and the magnitude of the input signal (e.g., control signal from the controller 150). For example, a metal oxide semiconductor field effect transistor (MOSFET) may be in an "ON" state if the MOSFET has a gate-to-source voltage greater than a threshold voltage, thereby allowing significant current to flow between its source and drain terminals. While a MOSFET type transistor is used as an illustrative example herein, embodiments are not limited to MOSFET transistors to implement a coupling circuit. Other types of transistors such as JFET, BJT, or CMOS types, as well as, other types of switching circuits may also be used to implement a coupling circuit to control a shield structure as described herein.

Returning to the MOSFET example, if the MOSFET's gate-to-source voltage is less than the threshold voltage, then the MOSFET may be in an "OFF" state, preventing significant current flow between its source and drain terminals. In addition, the magnitude of the difference between the gate-to-source voltage and the threshold voltage may determine how "ON" or "OFF" the transistor is. A MOSFET that is operating in the linear region (in other words, has a relatively small difference between the transistor's gate-to-source voltage and threshold voltage) may allow less current to flow and therefore be less "ON" than if the MOSFET were in saturation or active mode (in other words, has a relatively large difference between the transistor's gate-to-source voltage and threshold voltage). Similarly, a MOSFET that is operating close to the transition point between the linear region and subthreshold mode may be less "OFF", allowing more current to flow than if the MOSFET was operating more fully in subthreshold mode. In some embodiments, the relationship between the transistor current flow and the transistor gate-to-source voltage (or the difference between the gate-to-source voltage and the threshold voltage) may be continuously or near-continuously variable. Using such transistors in a coupling circuit of a metal shield such as the metal shields 120/220 may allow finer and more granular control of the developed eddy currents in the metal shield and the overall inductance of the inductance structure.

Figure 3:
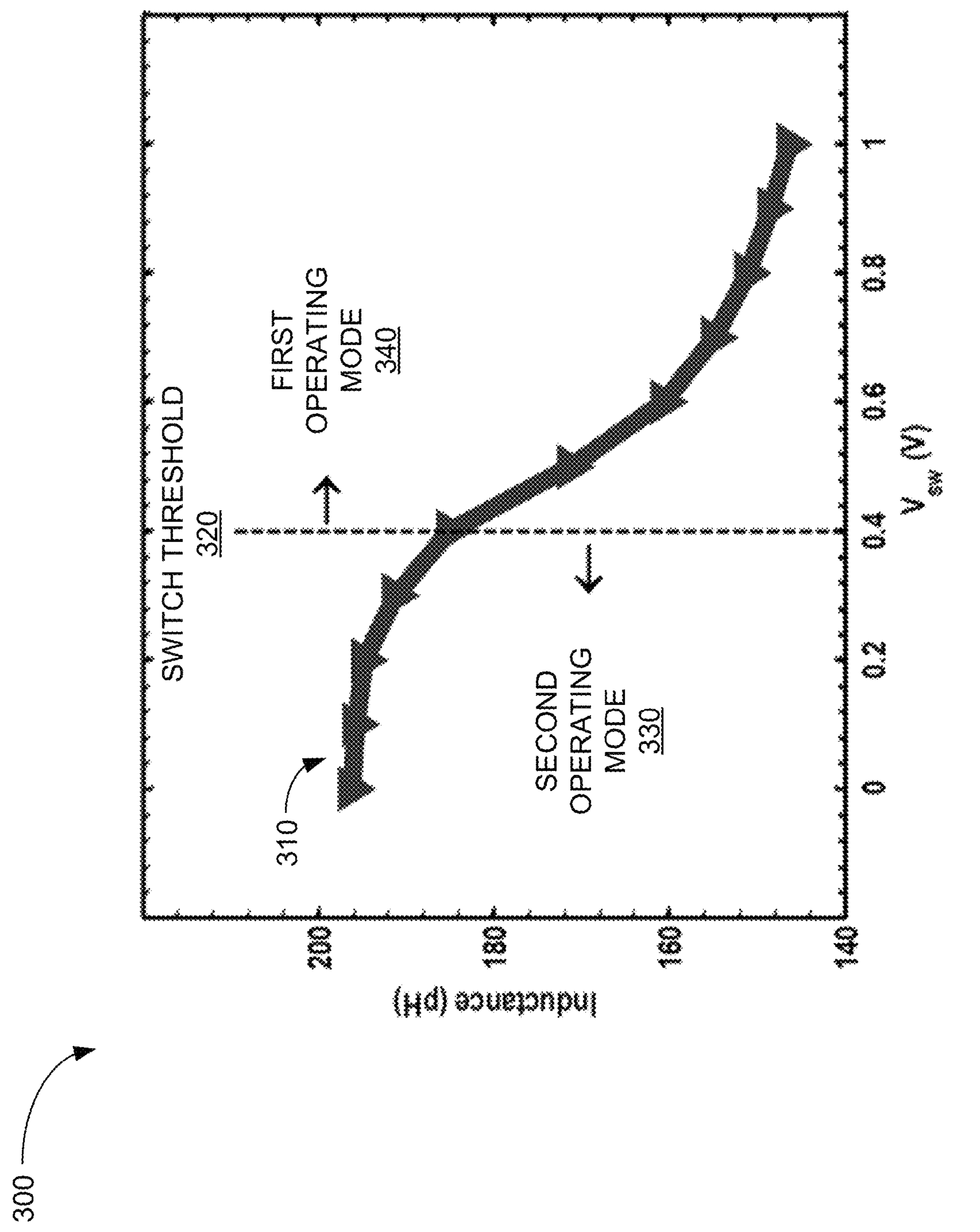
FIG. 3 illustrates substantially continuous variable control of an inductance structure using a switchable metal shield.

FIG. 3 illustrates substantially continuous variable control of an inductance structure using a switchable metal shield, arranged in accordance with at least some embodiments described herein.

Graph 300 depicts an inductance characteristic 310 of an inductance structure similar to the inductance structure 100A. The vertical or y-axis of the graph 300 depicts the overall inductance of the inductance structure while the horizontal or x-axis of the graph 300 depicts the voltage of an input signal (for example, provided to the input 148) of a coupling circuit (for example, the coupling circuit 140) of the inductance structure. When the input signal is larger than a switch threshold 320, then the coupling circuit may be in a first operating mode 340, which may be similar to the first operating mode depicted in the diagram 200. When the input signal is smaller than the switch threshold 320, then the coupling circuit may be in a second operating mode 330, which may be similar to the second operating mode depicted in the diagram 250. In the first operating mode 340, the inductance characteristic 310 may decrease as the difference between the input signal and the switch threshold 320 increases. The decrease in the inductance characteristic 310 may occur because the coupling circuit allows more current to flow as the difference between the input signal and the switch threshold 320 increases, allowing a larger counteracting magnetic field to be developed, as described above in relation to the diagram 200. In contrast, in the second operating mode 330, the inductance characteristic 310 may increase as the difference between the input signal and the switch threshold 320 increases. The increase in the inductance characteristic 310 may occur because the coupling circuit allows less current to flow as the difference between the input signal and the switch threshold 320 increases, limiting the size of a counteracting magnetic field, as described above in relation to the diagram 250. The precise value of the overall inductance may then be adjusted by selecting an appropriate input signal to be provided to the coupling circuit.

Figure 4:
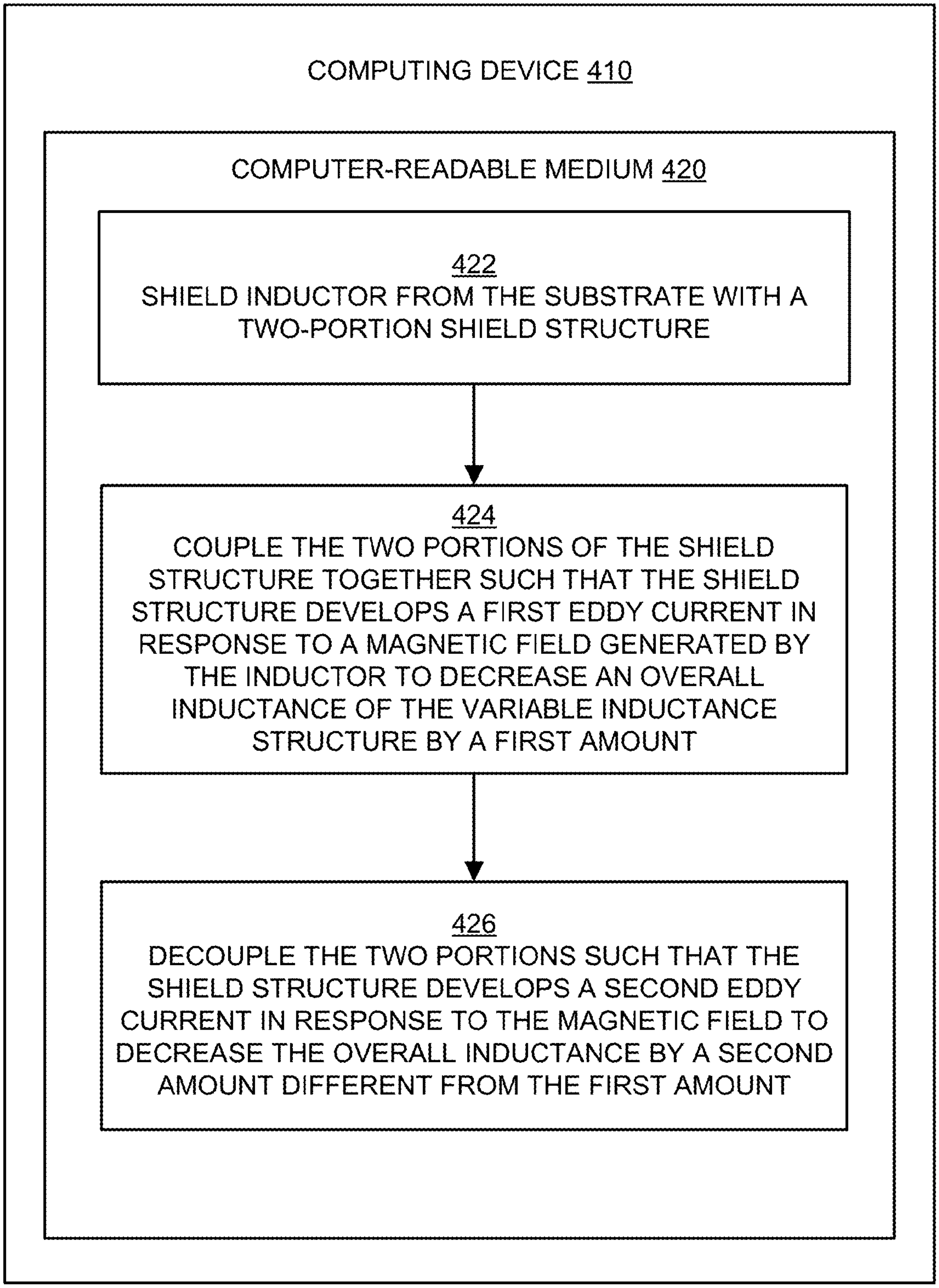
FIG. 4 is a flow diagram illustrating an example method to adjust a switchable metal shield inductance structure that may be performed by a computing device or controller such as the controller of FIG. 1A or FIG. 1B.

FIG. 4 is a flow diagram illustrating an example method to adjust a switchable metal shield inductance structure that may be performed by a computing device or controller such as the controller of FIG. 1A or FIG. 1B, arranged in accordance with at least some embodiments described herein.

Example methods may include one or more operations, functions or actions as illustrated by one or more of blocks 422, 424, and/or 426, and may in some embodiments be performed by a computing device such as the controller 150 in FIG. 1A. The operations described in the blocks 422-426 may also be stored as computer-executable instructions in a computer-readable medium such as a computer-readable medium 420 of a computing device 410 (e.g., computer readable storage 180 associated with the controller 150 as described in FIG. 1B).

An example process to adjust a switchable metal shield inductance structure may begin with block 422, "SHIELD INDUCTOR FROM THE SUBSTRATE WITH A TWO-PORTION SHIELD STRUCTURE", where a shield structure may be used to shield, isolate, or separate an inductor disposed over a substrate with circuits therein from the substrate. In situations where an inductor is disposed on a substrate without the presence of shielding, the substrate and the inductor may be coupled together. The coupling between the substrate and the inductor may result in energy transfer between the substrate and the inductor, which may reduce inductor performance (for example, as measured by an inductor quality factor), in turn leading to performance degradation in devices associated with the inductor. Thus, the shielding provided by the shield structure may prevent degradation of inductor performance.

Block 422 may be followed by block 424, "COUPLE THE TWO PORTIONS OF THE SHIELD STRUCTURE TOGETHER SUCH THAT THE SHIELD STRUCTURE DEVELOPS A FIRST EDDY CURRENT IN RESPONSE TO A MAGNETIC FIELD GENERATED BY THE INDUCTOR TO DECREASE AN OVERALL INDUCTANCE OF THE VARIABLE INDUCTANCE STRUCTURE BY A FIRST AMOUNT", where a coupling circuit (e.g., formed of one or more transistors) may couple two or more portions of the shield structure together such that the shield structure develops a first eddy current in response to a magnetic field generated by the inductor. The first eddy current may then result in a magnetic field that opposes the inductor-developed magnetic field, reducing the overall magnetic field and the overall inductance by a first amount.

Block 424 may be followed by block 426, "DECOUPLE THE TWO PORTIONS SUCH THAT THE SHIELD STRUCTURE DEVELOPS A SECOND EDDY CURRENT IN RESPONSE TO THE MAGNETIC FIELD TO DECREASE THE OVERALL INDUCTANCE BY A SECOND AMOUNT DIFFERENT FROM THE FIRST AMOUNT", where the coupling circuit may decouple the two portions such that the shield structure develops a second eddy current in response to the magnetic field. The second eddy current may then result in another magnetic field that opposes the inductor-developed magnetic field, reducing the overall magnetic field and the overall inductance by a second amount different from the first amount.

In order to prevent the reduction of the overall magnetic field and the changes in the overall inductance from happening inadvertently, a gap in the shield structure may introduce discontinuities in an outer ring and an inner ring, for example, preventing the formation of a closed current loop in either ring.

As described above, the tendency of an inductor-developed magnetic field to induce eddy currents may be utilized to control the overall inductance of the inductance structure. For example, the gap in the shield structure may prevent eddy currents and their magnetic fields from developing, thus preventing reduction of the overall inductance. On the other hand, if the gap is closed, then eddy currents and their magnetic fields may develop in the shield structure, causing a reduction in the overall inductance. By selectively opening and closing the gap, the overall inductance may be controlled. In some embodiments, inductance decrease values may be stored in a lookup table and a controller may determine an appropriate value based on the lookup table and provide a control signal to the coupling circuit to affect the inductance adjustment.

Figure 5:
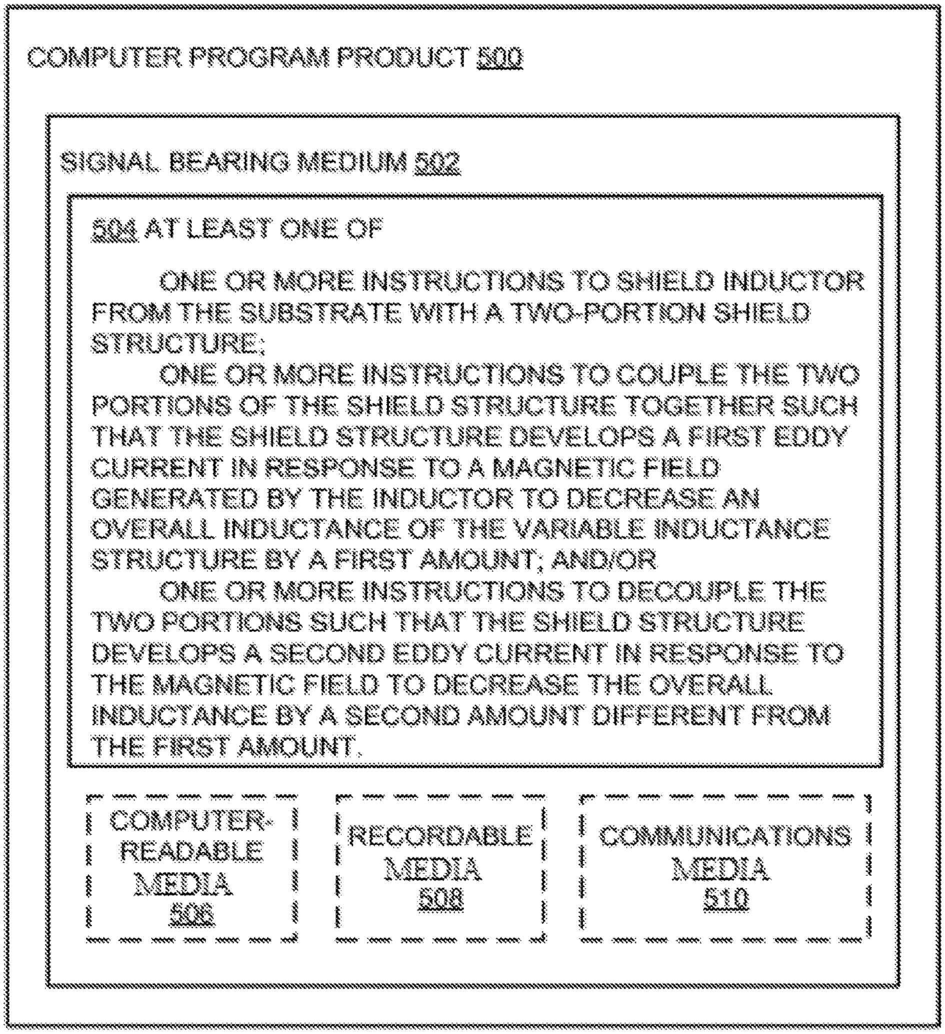
FIG. 5 illustrates a block diagram of an example computer program product, all arranged in accordance with at least some embodiments described herein.

FIG. 5 illustrates a block diagram of an example computer program product, arranged in accordance with at least some embodiments described herein.

In some examples, as shown in FIG. 5, a computer program product 500 may include a signal bearing medium 502 that may also include one or more machine readable instructions 504 that, when executed by, for example, a processor may provide the functionality described herein. Some of those instructions may include, for example, instructions to shield inductor from the substrate with a two-portion shield structure, couple the two portions of the shield structure together such that the shield structure develops a first eddy current in response to a magnetic field generated by the inductor to decrease an overall inductance of the variable inductance structure by a first amount, and/or decouple the two portions such that the shield structure develops a second eddy current in response to the magnetic field to decrease the overall inductance by a second amount different from the first amount, according to some embodiments described herein.

In some implementations, the signal bearing media 502 depicted in FIG. 5 may encompass computer-readable media 506, such as, but not limited to, a hard disk drive, a solid state drive, a compact disk (CD), a digital versatile disk (DVD), a digital tape, memory, etc. In some implementations, the signal bearing media 502 may encompass recordable media 508, such as, but not limited to, memory, read/write (R/W) CDs, R/W DVDs, etc. In some implementations, the signal bearing media 502 may encompass communications media 510, such as, but not limited to, a digital and/or an analog communication medium (e.g., a fiber optic cable, a waveguide, a wired communications link, a wireless communication link, etc.). Thus, for example, the computer program product 500 may be conveyed to one or more modules of the processor 404 by an RF signal bearing medium, where the signal bearing media 502 is conveyed by the wireless communications media 510 (e.g., a wireless communications medium conforming with the IEEE 802.11 standard).

According to some examples, variable inductance structures on a substrate are described. An example variable inductance structure may include an inductor configured to develop a first magnetic field in response to a current flowing through the inductor, a shield structure configured to shield the inductor from the substrate, and a coupling circuit that includes a first terminal, a second terminal and a control terminal. The shield structure may include a first portion with a first terminal and a second portion with a second terminal. The first terminal of the coupling circuit may be coupled to the first terminal of the shield structure, the second terminal of the coupling circuit may be coupled to the second terminal of the shield structure, and the control terminal may be configured to receive a control signal, where the coupling circuit is configured to selectively adjust a coupling of the first and second terminals in response to the control signal such that the shield structure and the inductor are configured in one or more of a first mode and a second mode. A first eddy current may be developed in response to the first magnetic field in the first mode effective to decrease an overall inductance of the variable inductance structure by a first amount, and a second eddy current may be developed in response to the first magnetic field in the second mode effective to decrease the overall inductance by a second amount different from the first amount.

According to other examples, the shield structure may be a single-layer structure. The first portion of the shield structure may include a first conductive ring to develop the first and second eddy currents, the first conductive ring having two portions separated by a gap, where the gap corresponds to a discontinuity between the two portions of the first conductive ring. The discontinuity in the first conductive ring may be bridged in the first mode and the discontinuity in the first conductive ring may be maintained in the second mode. The discontinuity may be bridged through coupling of the first conductive ring to a reference potential. The second portion of the shield structure may include a second conductive ring to develop the first and second eddy currents in conjunction with the first conductive ring.

According to further examples, the coupling circuit may be configured to selectively adjust the coupling of the first and second terminals in response to the control signal such that the first and second eddy currents are developed through a first current component in the first conductive ring and a second current component in the second conductive ring, and the first and second terminals may be coupled in response to the control signal such that the first current component and the second current component flow in substantially the same direction in the first mode and the first current component and the second current component flow in substantially opposite directions in the second mode. The shield structure further may include a third portion with a third terminal. The coupling circuit may be further configured to selectively adjust the coupling of the first, second, and third terminals in response to the control signal.

According to other examples, variable inductance structures on a substrate are described. An example variable inductance structure may include an inductor to develop a first magnetic field in response to a current flowing through the inductor and a shield structure to shield the inductor from the substrate, where the shield structure may include a first portion and a second portion, the first portion and the second portion selectively couplable based on a control signal. The shield structure may be configured to, in a first mode, develop a first eddy current in response to the first magnetic field such that an overall inductance of the variable inductance structure is decreased by a first amount; and, in a second mode, develop a second eddy current in response to the first magnetic field such that the overall inductance is decreased by a second amount different from the first amount.

According to some examples, the shield structure may be a single-layer structure. The shield structure may include a first conductive ring having a discontinuity, the first conductive ring configured to develop the first and second eddy currents. The shield structure may further include a coupling circuit to bridge the discontinuity in the first conductive ring in the first mode and to maintain the discontinuity in the first conductive ring in the second mode in response to receiving the control signal. The coupling circuit may be configured to bridge the discontinuity through coupling the first conductive ring to a reference potential. According to other examples, the coupling circuit may be configured to selectively bridge and maintain discontinuities in the first conductive ring and the second conductive ring to allow the shield structure to develop a first current component in the first conductive ring and a second current component in the second conductive ring such that the first current component and the second current component flow in substantially the same direction in the first mode and the second current component flow in substantially the same direction in the second mode. The shield structure may further include a third conductive ring to develop the first and second eddy currents in conjunction with the first and second conductive rings. The coupling circuit may be arranged to be activated based on a magnitude of the control signal.

According to further examples, methods to adjust an inductance of a variable inductance structure on a substrate are described. An example method may include shielding an inductor from the substrate with a shield structure, where the shield structure includes two portions; coupling the two portions of the shield structure together such that the shield structure develops a first eddy current in response to a magnetic field generated by the inductor to decrease an overall inductance of the variable inductance structure by a first amount; and decoupling the two portions such that the shield structure develops a second eddy current in response to the magnetic field to decrease the overall inductance by a second amount different from the first amount, where the second eddy current is smaller than the first eddy current.

According to some examples, the method may also include receiving a control signal and in response to the received control signal, coupling the two portions together such that a magnitude of the first eddy current is based on a magnitude of the received control signal. Coupling the two portions together may include bridging a gap in a first conductive ring of the shield structure such that the two portions are electrically coupled across the gap. The two portions may correspond to a first end of the first conductive ring proximate to the gap and a second end of the first conductive ring proximate to the gap and opposite the first end.

According to yet other examples, decoupling the two portions may include maintaining the gap. Bridging the gap may include electrically coupling the two portions to a reference potential. Coupling the two portions together may further include adjusting a second conductive ring in the shield structure such that the second conductive ring develops the first eddy current in conjunction with the first conductive ring; and decoupling the two portions may include adjusting the second conductive ring such that the second conductive ring develops the second eddy current in conjunction with the first conductive ring. Coupling the two portions together may further include causing a first current component developed in the first conductive ring to flow in substantially the same direction as a second current component developed in the second conductive ring; and decoupling the two portions may further include causing the first current component and the second current component to flow in substantially opposite directions.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A variable inductance structure on a substrate, the variable inductance structure comprising:

an inductor configured to develop a first magnetic field in response to a current that flows through the inductor;

a shield structure integrated with the inductor on a single layer and configured to shield the inductor from the substrate, the shield structure comprising:

a first portion with a first terminal; and a second portion with a second terminal, wherein the first portion and the second portion are formed on the single layer; and a coupling circuit that includes a first terminal, a second terminal and a control terminal, wherein:

the first terminal of the coupling circuit is coupled to the first terminal of the shield structure, the second terminal of the coupling circuit is coupled to the second terminal of the shield structure, and the control terminal is configured to receive a control signal and selectively adjust a coupling of the first terminal of the coupling circuit to the first terminal of the shield structure and a coupling of the second terminal of the coupling circuit to the second terminal of the shield structure in response to the control signal such that the shield structure forms a single conductive ring for eddy currents to flow in a first mode of coupling or a second mode of coupling and the shield structure and the inductor are configured in one or more of the first mode and the second mode, wherein:

a first eddy current is developed in response to the first magnetic field in the first mode such that an overall inductance of the variable inductance structure is decreased by a first amount, and a second eddy current is developed in response to the first magnetic field in the second mode such that the overall inductance is decreased by a second amount different from the first amount.

2. The variable inductance structure of claim 1, wherein the first portion of the shield structure includes a first conductive ring to develop the first and second eddy currents, the first conductive ring having two portions separated by a gap, and wherein the gap corresponds to a discontinuity between the two portions of the first conductive ring.

3. The variable inductance structure of claim 2, wherein the discontinuity between the two portions of the first conductive ring is bridged in the first mode and the discontinuity between the two portions of the first conductive ring is maintained in the second mode.

4. The variable inductance structure of claim 3, wherein the discontinuity is bridged through coupling of the first conductive ring to a reference potential.

5. The variable inductance structure of claim 2, wherein the second portion of the shield structure includes a second conductive ring to develop the first and second eddy currents in conjunction with the first conductive ring.

6. The variable inductance structure of claim 5, wherein the coupling circuit is configured to selectively adjust the coupling of the first and second terminals of the coupling circuit to the first and second terminals of the shield structure, respectively, in response to the control signal such that the first and second eddy currents are developed through a first current component in the first conductive ring and a second current component in the second conductive ring, and wherein the first and second terminals of the coupling circuit are respectively coupled to the first and second terminals of the shield structure in response to the control signal such that the first current component and the second current component flow in substantially a same direction in the first mode and the first current component and the second current component flow in substantially opposite directions in the second mode.

7. The variable inductance structure of claim 1, wherein the coupling circuit comprises:

a first transistor circuit with a first transistor conduction terminal coupled to the first terminal of the shield structure, a first transistor control terminal configured to receive the control signal, and a second transistor conduction terminal coupled to a reference terminal; and a second transistor with a third transistor conduction terminal coupled to the second terminal of the shield structure, a second transistor control terminal configured to receive the control signal, and a fourth transistor conduction terminal coupled to the reference terminal.

8. The variable inductance structure of claim 7, wherein the first transistor circuit includes a first field effect transistor and the second transistor circuit includes a second field effect transistor, wherein the first and third transistor conduction terminals correspond to drain terminals, the first and second transistor control terminals correspond gate terminals, and the second and fourth transistor conduction terminals correspond to source terminals.

9. The variable inductance structure of claim 7, wherein the reference terminal corresponds to a circuit ground.

10. The variable inductance structure of claim 7, wherein the first transistor circuit and the second transistor circuit are forward biased to conduct in a saturation mode.

11. The variable inductance structure of claim 7, wherein the first transistor circuit and the second transistor circuit are reverse biased to conduct in a non-saturation mode.

12. A variable inductance structure on a substrate, the variable inductance structure comprising:

an inductor to develop a first magnetic field in response to a current that flows through the inductor; and a shield structure to shield the inductor from the substrate, wherein the shield structure is integrated with the inductor on a single layer and comprises a first portion and a second portion on the single layer, the first portion and the second portion are selectively couplable based on a control signal, the shield structure forms a single conductive ring for eddy currents to flow in a first mode of coupling or a second mode of coupling, and the shield structure is configured to:

in the first mode, develop a first eddy current in response to the first magnetic field such that an overall inductance of the variable inductance structure is decreased by a first amount; and in the second mode, develop a second eddy current in response to the first magnetic field such that the overall inductance is decreased by a second amount different from the first amount.

13. The variable inductance structure of claim 12, wherein the shield structure includes a first conductive ring having a discontinuity, the first conductive ring configured to develop the first and second eddy currents.

14. The variable inductance structure of claim 13, wherein the shield structure further includes a coupling circuit to bridge the discontinuity in the first conductive ring in the first mode in response to receipt of the control signal and to maintain the discontinuity in the first conductive ring in the second mode in response to receipt of the control signal.

15. The variable inductance structure of claim 14, wherein the coupling circuit is configured to bridge the discontinuity through coupling the first conductive ring to a reference potential.

16. The variable inductance structure of claim 14, wherein the shield structure further includes a second conductive ring to develop the first and second eddy currents in conjunction with the first conductive ring.

17. The variable inductance structure of claim 16, wherein the coupling circuit is configured to selectively bridge and maintain discontinuities in the first conductive ring and the second conductive ring to allow the shield structure to develop a first current component in the first conductive ring and a second current component in the second conductive ring such that the first current component and the second current component flow in substantially a same direction in the first mode, and the first current component and the second current component flow in substantially opposite directions in the second mode.

18. The shield structure of claim 14, wherein the coupling circuit is arranged to be activated based on a magnitude of the control signal.

19. A method to adjust an inductance of a variable inductance structure on a substrate, the method comprising:

shielding an inductor from the substrate with a shield structure, wherein the shield structure includes two portions, wherein the two portions of the shield structure are integrated with the inductor on a single layer;

coupling the two portions of the shield structure together such that the shield structure develops a first eddy current in response to a magnetic field generated by the inductor to decrease an overall inductance of the variable inductance structure by a first amount; and decoupling the two portions such that the shield structure develops a second eddy current in response to the magnetic field to decrease the overall inductance by a second amount different from the first amount, wherein the second eddy current is smaller than the first eddy current, wherein the shield structure forms a single conductive ring for eddy currents to flow when the two portions are coupled or when the two portions are decoupled.

20. The method of claim 19, further comprising:

receiving a control signal; and in response to the received control signal, coupling the two portions together such that a magnitude of the first eddy current is based on a magnitude of the received control signal.

21. The method of claim 20, wherein:

coupling the two portions together comprises bridging a gap in a first conductive ring of the shield structure such that the two portions are electrically coupled across the gap; and the two portions correspond to a first end of the first conductive ring proximate to the gap and a second end of the first conductive ring proximate to the gap and opposite to the first end.

22. The method of claim 21, wherein decoupling the two portions comprises maintaining the gap.

23. The method of claim 22, wherein bridging the gap comprises electrically coupling the two portions to a reference potential.

24. The method of claim 21, wherein:

coupling the two portions together further comprises adjusting a second conductive ring in the shield structure such that the second conductive ring develops the first eddy current in conjunction with the first conductive ring; and decoupling the two portions comprises adjusting the second conductive ring such that the second conductive ring develops the second eddy current in conjunction with the first conductive ring.

25. The method of claim 24, wherein:

coupling the two portions together further comprises causing a first current component developed in the first conductive ring to flow in substantially a same direction as a second current component developed in the second conductive ring; and decoupling the two portions further comprises causing the first current component and the second current component to flow in substantially opposite directions.

* * * * *